(12) United States Patent
Nakamura

(10) Patent No.: US 6,414,295 B1
(45) Date of Patent: Jul. 2, 2002

(54) IMAGE-SENSING DEVICE AND SIGNAL PROCESSING METHOD IN AN IMAGE-SENSING DEVICE

(75) Inventor: Satoshi Nakamura, Ikeda (JP)

(73) Assignee: Minolta Co., Ltd., Osaka (JP)

( * ) Notice: Subject to any disclaimer, the term of this patent is extended or adjusted under 35 U.S.C. 154(b) by 66 days.

(21) Appl. No.: 09/633,547

(22) Filed: Aug. 7, 2000

(30) Foreign Application Priority Data

Aug. 9, 1999 (JP) ............................................. 11-225659

(51) Int. Cl.$^7$ ............................................... H01L 27/00

(52) U.S. Cl. .................. 250/208.1; 250/214 P

(58) Field of Search .......................... 250/280.1, 214 P, 250/214 R; 396/102, 104; 356/223, 219; 348/272, 297; 257/291

(56) References Cited

U.S. PATENT DOCUMENTS

| 5,241,575 A | 8/1993 | Miyatake et al. .............. 377/60 |
| 5,289,286 A | 2/1994 | Nakamura et al. ........... 348/223 |
| 5,815,748 A | * 9/1998 | Hamamura et al. ......... 396/104 |

* cited by examiner

Primary Examiner—Que T. Le
(74) Attorney, Agent, or Firm—Sidley Austin Brown & Wood LLP

(57) ABSTRACT

In an image-sensing device, the output of an area sensor 1 obtained as an electric signal logarithmically proportional to the amount of incident light is converted by a conversion circuit 3 into an electric signal linearly proportional to the amount of incident light by use of a conversion formula for exponential conversion stored in a memory 2. The thus converted output is fed to a processing circuit 4 so that, even if the area sensor 1 is a LOG sensor, the processing circuit 4 of a conventional circuit design configured to process a linearly converted signal can process the electric signal output from the area sensor 1.

8 Claims, 5 Drawing Sheets

IMAGE-SENSING DEVICE AND SIGNAL PROCESSING METHOD IN AN IMAGE-SENSING DEVICE

This application is based on application No. H11-225659 filed in Japan on Aug. 9, 1999, the entire contents of which are hereby incorporated by reference.

BACKGROUND OF THE INVENTION

1. Field of the Invention

The present invention relates to an image-sensing device that yields an output logarithmically proportional to the amount of incident light, and to a signal processing method used in such an image-sensing device.

2. Description of the Prior Art

A conventional area sensor having photosensitive devices such as photodiodes outputs a signal that is linearly proportional to the brightness of the light incident on the photosensitive devices as shown at (a) in FIG. 8. When a subject having brightness distribution as shown at (b) in FIG. 8 is shot with such a linear-conversion-based area sensor (hereafter referred to as a "linear sensor"), no brightness data is obtained outside the roughly two-digit brightness range (dynamic range) within which the linear sensor can effectively perform image sensing (this brightness range will be referred to as the shootable brightness range). (Here, the brightness range is represented as Lmax/Lmin, assuming that the brightness of the subject distributes from a minimum value Lmin [cd/m$^2$] to a maximum value Lmax [cd/m$^2$], and the shootable brightness range is called the dynamic range).

This is because the output range is proportional to the dynamic range, and is thus narrow. Accordingly, when an image is reproduced on an output device, such as a display, that uses a signal obtained from such a linear sensor, the reproduced image suffers, outside the shootable brightness range, flat blackness in a low-brightness region and flat whiteness (saturation) in a high-brightness region. To avoid such flat blackness or flat whiteness, it is necessary, according as the brightness distribution, shown at (b) in FIG. 8, of the subject varies, to shift the shootable brightness range of the area sensor by varying the aperture value and shutter speed of a camera, or by varying the integration time of the incident light.

On the other hand, the assignee of the present invention once proposed an area sensor (hereafter referred to as a "LOG sensor") provided with a photosensitive means that produces a photoelectric current in accordance with the amount of incident light, a MOS transistor to which the photoelectric current is fed, and a bias means for biasing the MOS transistor in such a way that a subthreshold current flows therethrough, so that the photoelectric current is converted logarithmically (refer to U.S. Pat. No. 5,241,575). As shown at (a) in FIG. 9, a LOG sensor like this yields an output whose level is natural-logarithmically proportional to the brightness of incident light, and thus offers as wide as a five- to six-digit dynamic range. This permits the brightness distribution, shown at (b) in FIG. 9, of a subject to lie within the shootable brightness range in most cases even if the brightness distribution varies.

An area sensor such as a linear sensor or LOG sensor as described above is usually incorporated in an image-sensing device formed on a one-chip IC (integrated circuit) together with circuits that perform various kinds of signal processing, such as HVC (hue-value-chroma) processing performed to convert the RGB signals from the area sensor into HVC signals representing hue, value, and chroma respectively, color conversion performed to convert signals to achieve proper color matching and thereby achieve proper color rendering on an output device such as a display or printer, and edge enhancement performed to enhance sharpness in edge portions of a reproduced image. Most image-sensing devices are designed for use with a linear sensor, and therefore the circuits provided therein as the stage succeeding the area sensor to perform various kinds of signal processing, such as HVC processing, color conversion, and edge enhancement, are designed to process a signal obtained from a linear sensor.

For this reason, when a LOG sensor, which offers a wide dynamic range, is incorporated as an area sensor in an image-sensing device, the circuits provided therein as the stage succeeding the area sensor to perform various kinds of signal processing need to be modified so as to be able to process a signal obtained from, not a conventionally commonly used linear sensor, but a LOG sensor.

SUMMARY OF THE INVENTION

An object of the present invention is to provide an image-sensing device that incorporates a LOG sensor offering a wide dynamic range but that nevertheless permits the output from the LOG sensor to be processed properly even if the circuits provided therein as the stage succeeding the LOG sensor to perform various kinds of signal processing are left unmodified from circuit designs configured to process a linearly converted signal.

To achieve the above object, according to one aspect of the present invention, an image-sensing device is provided with: a photoelectric converter, having a photosensitive device that produces an electric signal in accordance with the amount of incident light, for logarithmically converting the electric signal produced by the photosensitive device and then outputting the converted electrical signal; a signal processing circuit; and an output converter for converting the electric signal output from the photoelectric converter into an electric signal linearly proportional to the amount of incident light and for feeding to the signal processing circuit the thus converted electrical signal which is linearly proportional to the amount of incident light.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
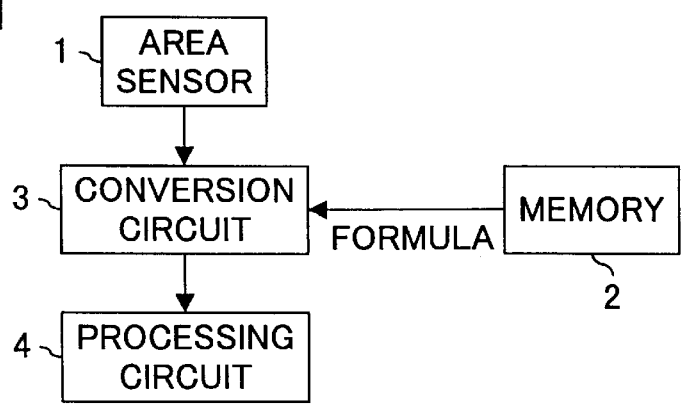
FIG. 1 is a block diagram showing the internal configuration of the image-sensing device of a first embodiment of the invention.

FIG. 1 is a block diagram showing the internal configuration of the image-sensing device of a first embodiment of the present invention. This image-sensing device is composed of the following components. An area sensor 1 is provided with a photosensitive device that produces a photoelectric current in accordance with the amount of incident light, and a means for converting the photoelectric current to an electric signal that is converted as to be naturallogarithmically proportional to the amount of incident light and which is outputted by the area sensor 1 as an electrical output signal. A memory 2 is used to store a conversion formula by use of which the electric signal output from the area sensor 1 is converted into an electric signal equivalent to an electric signal so converted as to be linearly proportional to the amount of incident light. A conversion circuit 3 converts the electric signal output from the area sensor 1 by using the conversion formula stored in the memory 2. A processing circuit 4 performs various kinds of signal processing, such as HVC processing, color conversion, and edge enhancement, on the electric signal output from the conversion circuit 3. In this embodiment, it is assumed that the area sensor has a three-digit dynamic range (i.e. Lmax/Lmin=1000), and that the electric signal output from the area sensor 1 is used in the form of 12-bit digital data.

Figure 2:
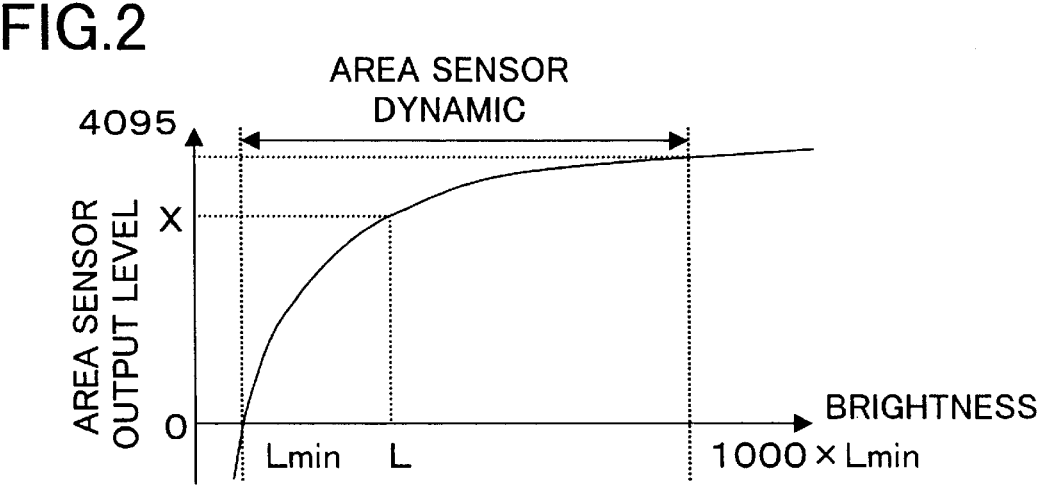
FIG. 2 is a graph showing the relationship between the brightness of the light incident on the area sensor and the electric signal output from the area sensor.

In this area sensor 1, the brightness of the light incident thereon and the output thereof have a relationship as shown in FIG. 2. Specifically, the area sensor 1 offers a dynamic range from Lmin [cd/m$^2$] to 1000×Lmin [cd/m$^2$], and yields an output with a gradation of 0 to $2^{12}$−=4,095 steps. When any pixel of this area sensor 1 receives light having a brightness of L [cd/m$^2$], its output X is given by formula (1) below. In formula (1), the symbol A represents a constant of which the value is given by formula (2) below.

$$X = A \cdot \ln\frac{L}{Lmin} \quad (1)$$

$$A = \frac{4095}{\ln 1000} \quad (2)$$

To convert this logarithmically converted electric signal into a linearly converted electric signal, first, the brightness is calculated by performing exponential conversion as represented by formula (3) below. Here, formula (3) can be rearranged as formula (4) below, and therefore substituting the value of formula (2) in formula (4) yields formula (5) below. The value of L/Lmin appearing in formulae (4) and (5) will hereafter be referred to as the "brightness ratio".

$$L = Lmin \cdot \exp\left(\frac{X}{A}\right) \quad (3)$$

$$\frac{L}{Lmin} = 1000^{\frac{X}{A} \cdot \log_{1000} e} \quad (4)$$

$$\frac{L}{Lmin} = 1000^{\frac{X}{4095}} \quad (5)$$

Figure 3:
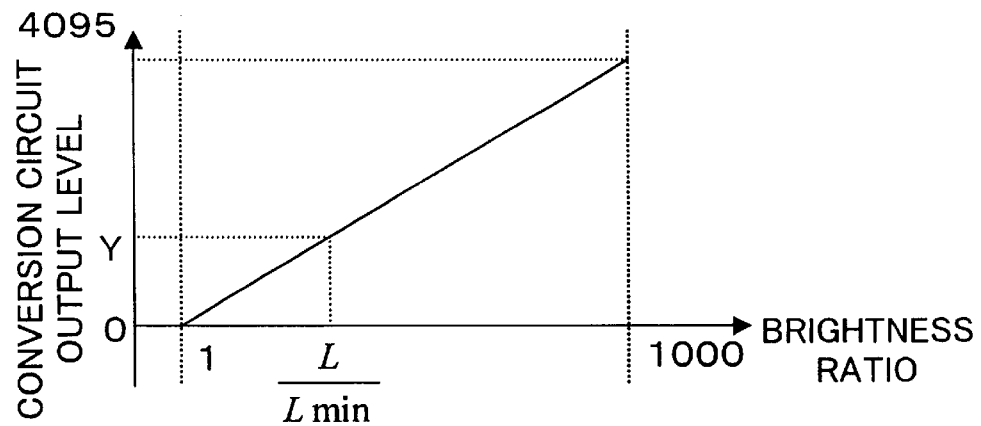
FIG. 3 is a graph showing the relationship between the brightness of the light incident on the area sensor and the electric signal output from the conversion circuit.

The brightness ratio thus calculated through exponential conversion is then mapped to output levels of 0 to 4,095 through linear conversion as shown in FIG. 3. As a result, the electric signal outputted by area sensor 1 is converted into an electric signal equivalent to an electric signal so converted as to be linearly proportional to the brightness of the incident light. As will be clear from FIG. 3, an output level of 0 corresponds to a brightness ratio of 1 and an output level of 4,095 corresponds to a brightness ratio of 1000. Thus, the output level, if expressed by using the brightness ratio L/Lmin, is given by formula (6) below. Hence, when the area sensor 1 yields an electric signal having an output level of X, by substituting the output level X in a conversion formula like formula (7) below, it is possible to convert the electric signal into a linearly converted electric signal. This formula (7) is stored in the memory 2, and the conversion circuit 3, by using this formula (7), converts the electric signal output from the area sensor 1 and then feeds the converted electric signal to the processing circuit 4. The symbol Y represents the output level of the electric signal after conversion.

$$Y = \frac{4095}{1000-1}\left(\frac{L}{Lmin} - 1\right) \quad (6)$$

$$Y = \frac{4095}{1000-1}\left(1000^{\frac{X}{4095}} - 1\right) \quad (7)$$

In this way, it is possible to convert the logarithmically converted electric signal into a linearly converted electric signal. This makes it possible to use as the processing circuit 4 a processing circuit designed to process a signal obtained from a conventionally commonly used linear sensor.

Second Embodiment

Figure 4:
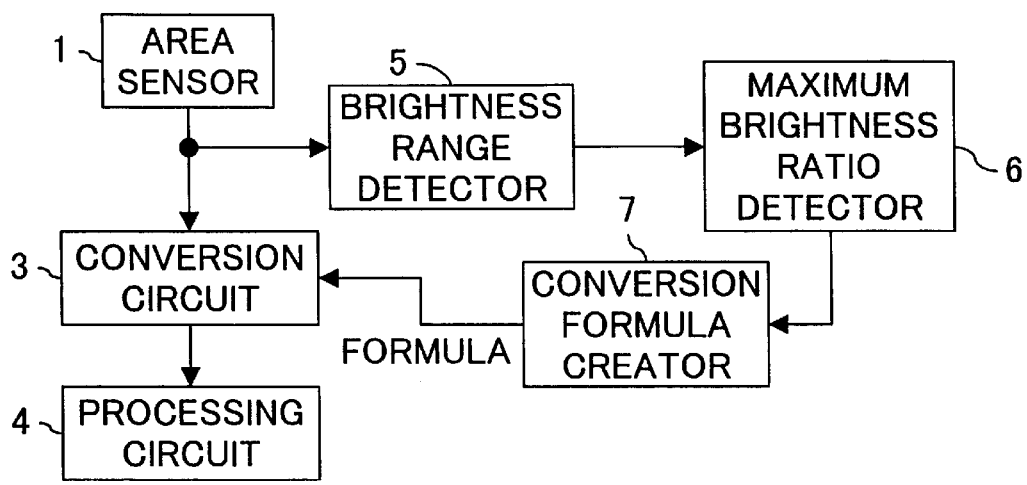
FIG. 4 is a block diagram showing the internal configuration of the image-sensing device of a second embodiment of the invention.

Next, a second embodiment of the present invention will be described with reference to the drawings. FIG. 4 is a block diagram showing the internal configuration of the image-sensing device of this embodiment. In the image-sensing device of this embodiment, such components as serve the same purposes as in the image-sensing device shown in FIG. 1 are identified with the same reference numerals, and their descriptions will not be repeated.

The image-sensing device shown in FIG. 4 has, in addition to an area sensor 1, a conversion circuit 3, and a processing circuit 4, the following components. A brightness range detector 5 detects the brightness range of a subject on the basis of an electric signal corresponding to one frame output from the area sensor 1. A maximum brightness ratio detector 6 detects the maximum and minimum brightness of the brightness range detected by the brightness range detector 5, and calculates, as the maximum brightness ratio, the ratio of the maximum brightness to the minimum brightness thus detected. A conversion formula creator 7 creates, by using the maximum brightness ratio calculated by the maximum brightness ratio detector, the conversion formula by use of which the electric signal output from the area sensor 1 is converted into an electric signal equivalent to an electric signal so converted as to be linearly proportional to the amount of incident light. In this embodiment, it is assumed that the area sensor has a dynamic range from Lmin [cd/m$^2$] to Lmax [cd/m$^2$], and that the electric signal output from the area sensor 1 is used in the form of 12-bit digital data.

Figure 5:
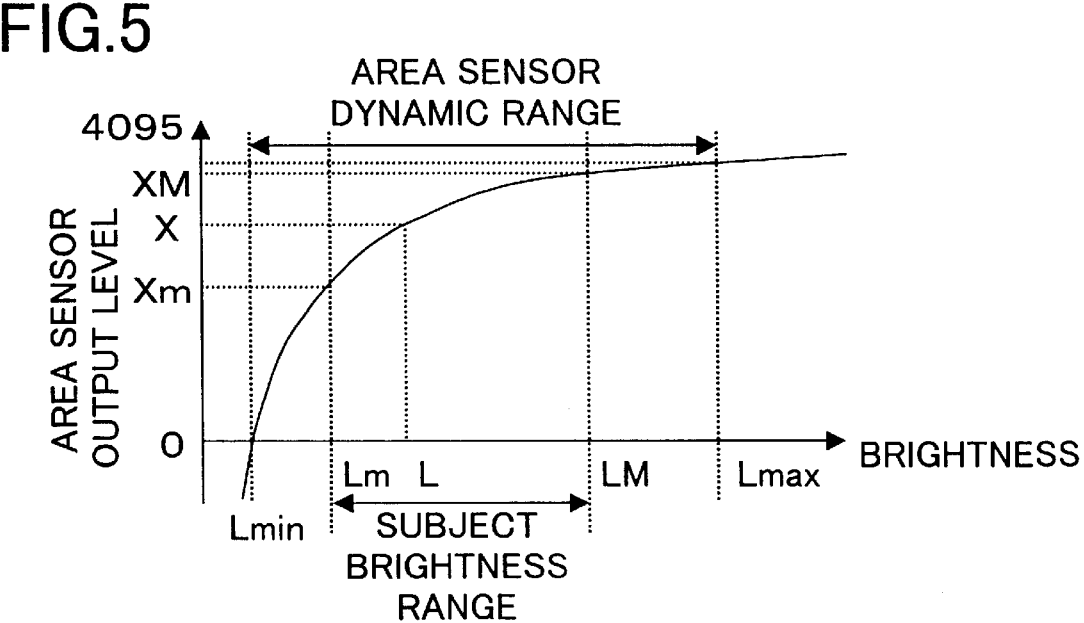
FIG. 5 is a graph showing the relationship between the brightness of the light incident on the area sensor and the electric signal output from the area sensor.

In this area sensor 1, the brightness of the light incident thereon and the output thereof have a relationship as shown in FIG. 5. Specifically, the area sensor 1 offers a dynamic range, i.e. a shootable brightness range, from Lmin [cd/m²] to Lmax [cd/m²], and yields an output with a gradation of 0 to $2^{12}-1=4,095$ steps. When any pixel of this area sensor 1 receives light having a brightness of L [cd/m²], its output X is given by formula (8) below. While this area sensor 1, which yields an output level of X when illuminated with light having a brightness of L [cd/m²], is sensing an image, an electric signal corresponding to one frame is fed to the brightness range detector 5. In formula (8), the symbol A represents a constant.

$$X = A \cdot \ln\frac{L}{L\min} \qquad (8)$$

Now, suppose that the subject being sensed has a brightness range from Lm [cd/m²] to LM [cd/m²]. Then, the electric signal output from the area sensor 1 has output levels within a range from Xm to XM. Here, the values of Xm to XM are given by formulae (9) and (10) respectively. This range, from Xm to XM, of the output level of the electric signal output from the area sensor 1 is detected by the brightness range detector 5. Here, the brightness range detector 5 achieves this by sequentially detecting the levels of the electric signals output from the individual pixels of the area sensor 1 one after another. The thus detected range, from Xm to XM, of the output level is fed to the maximum brightness ratio detector 6, which, by subjecting the minimum and maximum values Xm and XM of the output level to exponential conversion as represented by formula (11) below, calculates the minimum and maximum brightness Lm and LM and also the maximum brightness ratio LM/Lm. Here, the minimum and maximum values Xm and XM of the output level, the minimum and maximum brightness Lm and LM, and the constant A used in formula (8) have a relationship as represented by formula (12).

$$XM = A \cdot \ln\frac{LM}{L\min} \qquad (9)$$

$$Xm = A \cdot \ln\frac{Lm}{L\min} \qquad (10)$$

$$L = L\min \cdot \exp\left(\frac{X}{A}\right) \qquad (11)$$

$$A = \frac{XM - Xm}{\ln\left(\frac{LM}{Lm}\right)} \qquad (12)$$

The minimum and maximum values Xm and XM of the output level and the minimum and maximum brightness Lm and LM thus determined are fed to the conversion formula creator 7, which then creates a conversion formula by use of which the logarithmically converted electric signal obtained from the area sensor 1 is converted into a linearly converted electric signal. Now, this conversion formula created by the conversion formula creator 7 and used by the conversion circuit 3 will be described.

To convert the logarithmically converted electric signal having an output level of X into a linearly converted electric signal, first, the brightness is calculated by performing exponential conversion as represented by formula (11) below. Here, on the basis of the brightness range of the subject, formula (11) can be rearranged as formula (13) below by using the minimum brightness Lm, the maximum brightness LM, the minimum output level Xm, and maximum output level XM. Thus, substituting the value of formula (12) in formula (13) yields formula (14) below.

$$\frac{L}{Lm} = \left(\frac{LM}{Lm}\right)^{\frac{X-Xm}{A} \cdot \log_{LM/Lm} e} \qquad (13)$$

$$\frac{L}{Lm} = \left(\frac{LM}{Lm}\right)^{\frac{X-Xm}{XM-Xm}} \qquad (14)$$

Figure 6:
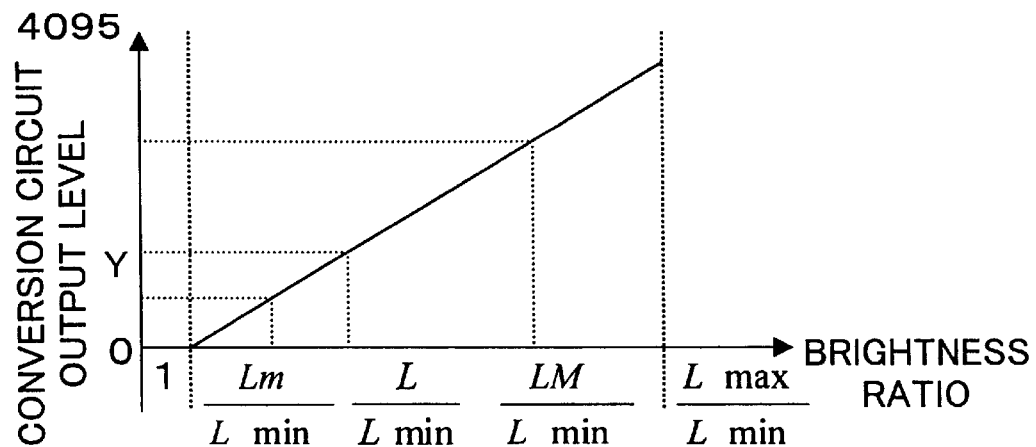
FIG. 6 is a graph showing the relationship between the brightness of the light incident on the area sensor and the electric signal output from the conversion circuit.

The brightness ratio thus calculated through exponential conversion is then mapped to output levels of 0 to 4,095 through linear conversion as shown in FIG. 6. As a result, the electric signal outputted by area sensor 1 is converted into an electric signal equivalent to an electric signal so converted as to be linearly proportional to the brightness of the incident light. As will be clear from FIG. 6, an output level of 0 corresponds to a brightness ratio of Lm/Lmin and an output level of 4,095 corresponds to a brightness ratio of LM/Lmin. Thus, the output level, if expressed by using the brightness ratio L/Lm relative to the minimum brightness Lm, is given by formula (15) below. Hence, when the area sensor 1 yields an electric signal having an output level of X, by substituting the output level X in a conversion formula like formula (16) below, it is possible to convert the electric signal into a linearly converted electric signal.

$$Y = \frac{4095}{\frac{LM}{Lm} - 1}\left(\frac{L}{Lm} - 1\right) \qquad (15)$$

$$Y = \frac{4095}{\frac{LM}{Lm} - 1}\left(\left(\frac{LM}{Lm}\right)^{\frac{X-Xm}{XM-Xm}} - 1\right) \qquad (16)$$

This formula (16) is created as the conversion formula by the conversion formula creator 7, and the conversion circuit 3, by using this formula (16), converts the electric signal output from the area sensor 1 and then feeds the converted electric signal to the processing circuit 4. The symbol Y represents the output level of the electric signal after conversion. When the logarithmically converted electric signal is converted into a linearly converted electric signal in this way, in the resulting electric signal, an output level of 0 represents a brightness of Lm and an output level of 4,095 represents a brightness of LM. Thus, it is possible to obtain an electric signal of which the width of the output level coincides with the brightness range of the subject.

Third Embodiment

Figure 7:
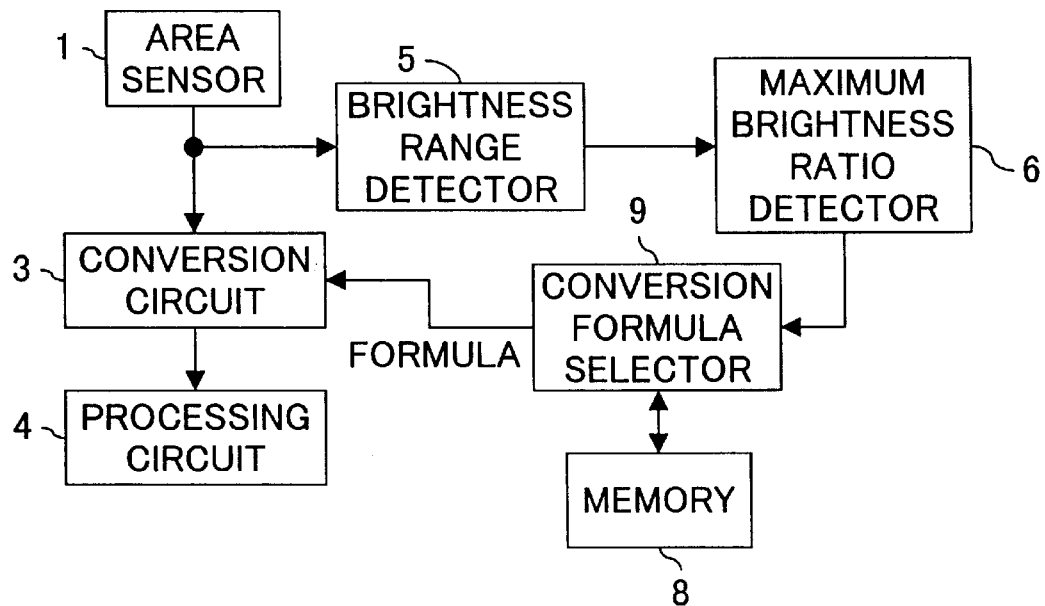
FIG. 7 is a block diagram showing the internal configuration of the image-sensing device of a third embodiment of the invention.
Figure 8:
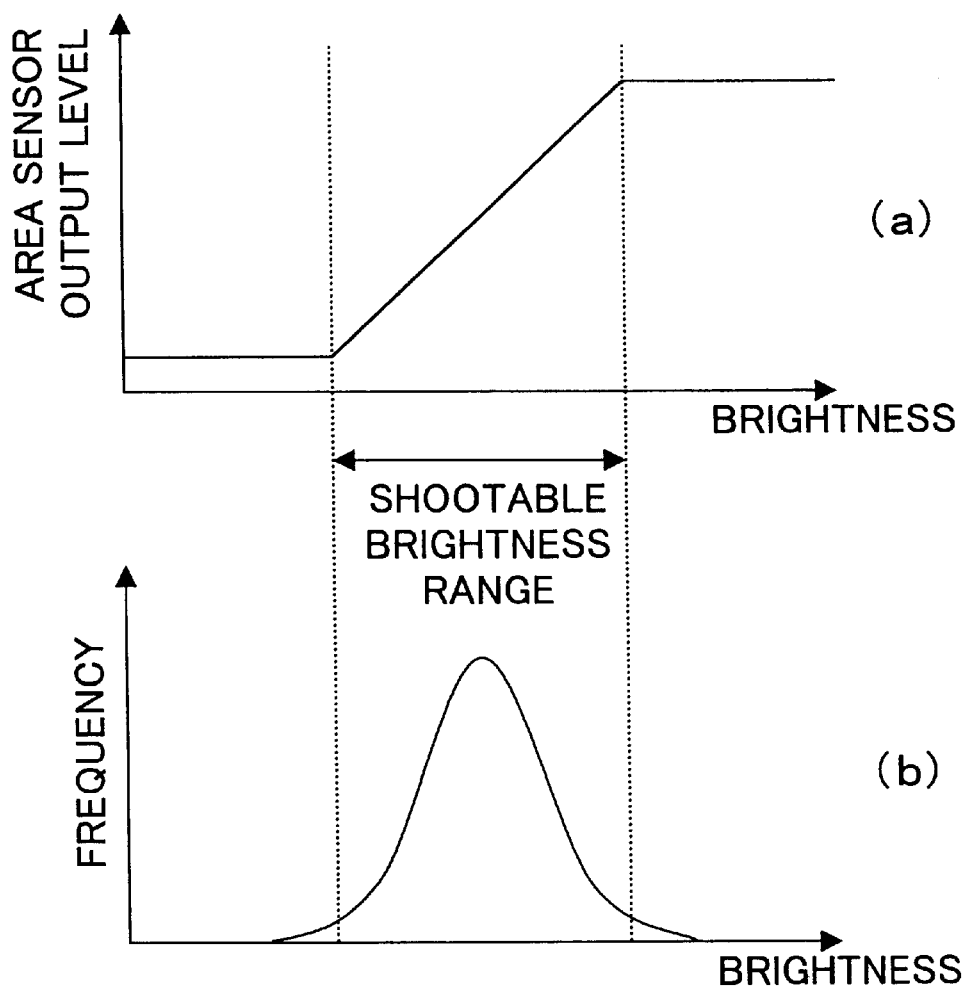
FIG. 8 is a graph showing the characteristics of a linear sensor.
Figure 9:
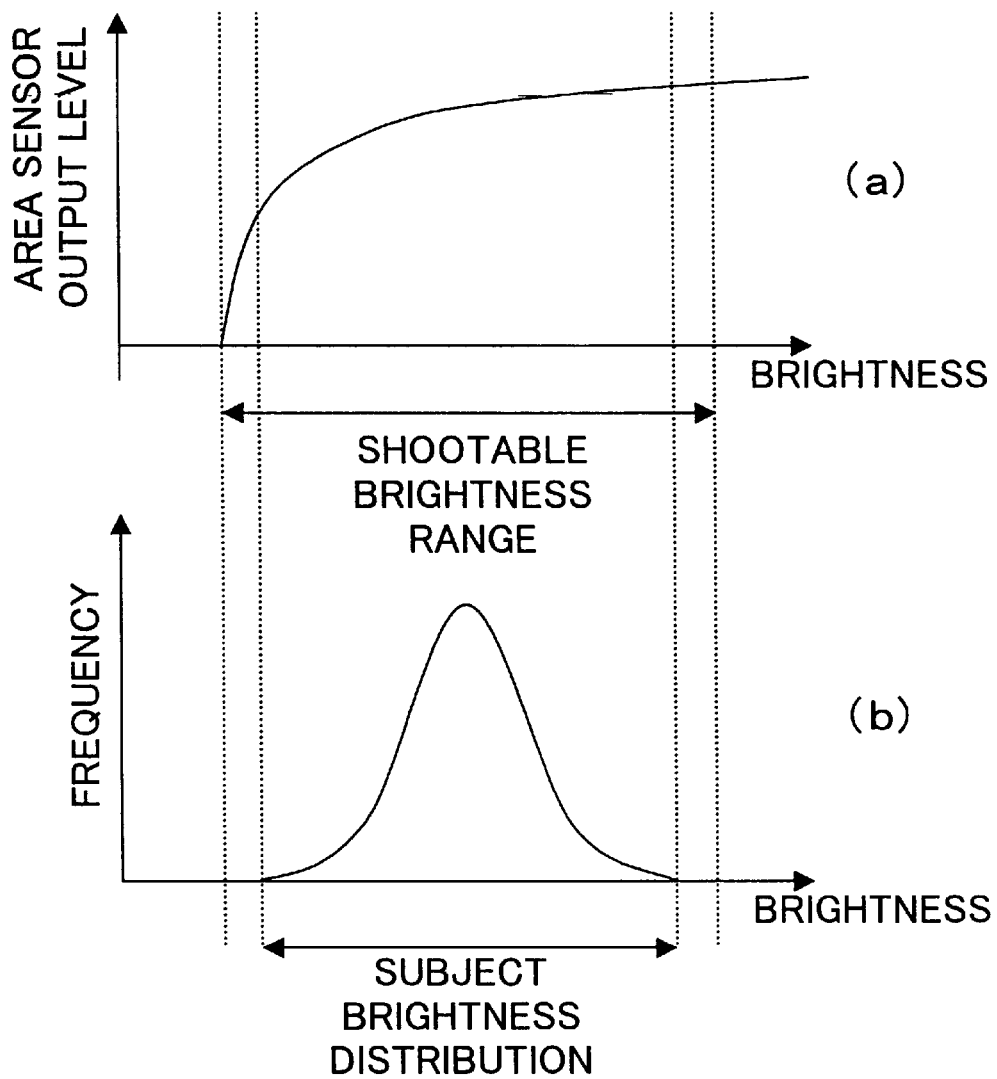
FIG. 9 is a graph showing the characteristics of a LOG sensor.

Next, a third embodiment of the present invention will be described with reference to the drawings. FIG. 7 is a block diagram showing the internal configuration of the image-sensing device of this embodiment. In the image-sensing device of this embodiment, such components as serve the same purposes as in the image-sensing device shown in FIG. 4 are identified with the same reference numerals, and their descriptions will not be repeated.

The image-sensing device shown in FIG. 7 has, in addition to an area sensor 1, a conversion circuit 3, a processing circuit 4, a brightness range detector 5, and a maximum brightness ratio detector 6, the following components. A memory 8 is used to store a plurality of types of conversion formulae used by the conversion circuit 3. A conversion formula selector 9 selects one among the plurality of types of conversion formulae stored in the memory 8 in accordance with the maximum brightness ratio detected by the maximum brightness ratio detector 6, and feeds the selected conversion formula to the conversion circuit 3. Here, the electric signal output from the area sensor 1 and the electric signal processed by the processing circuit 4 are both a 12-bit digital signal. The maximum brightness ratio detector 6 detects the maximum brightness ratio by calculating the difference between the maximum and minimum output levels of the electric signal obtained from the brightness range detector 5.

Now, suppose that, in the memory 8, six types of conversion formulae are stored that are all based on formula (17) below but that use different values as the constant Lt used therein, namely 100, 500, 1000, 3000, 5000, and 10000 (here, it is assumed that the area sensor 1 has a four-digit dynamic range at the maximum). The symbol X represents the output level of the electric signal output from the area sensor 1, and the symbol Y represents the output level of the electric signal after conversion by the conversion circuit 3.

$$Y = \frac{4095}{Lt-1}\left(Lt^{\frac{X-Xm}{4095 \times \ln\frac{Lt}{10000}}} - 1\right) \tag{17}$$

In the memory 8, these six types of conversion formulae are stored as shown in Table 1. Specifically, at the address a is stored a conversion formula obtained by substituting 100 for the constant Lt in formula (17), at the address b is stored a conversion formula obtained by substituting 500 for the constant Lt in formula (17), at the address c is stored a conversion formula obtained by substituting 1000 for the constant Lt in formula (17), at the address d is stored a conversion formula obtained by substituting 3000 for the constant Lt in formula (17), at the address e is stored a conversion formula obtained by substituting 5000 for the constant Lt in formula (17), and at the address f is stored a conversion formula obtained by substituting 10000 for the constant Lt in formula (17).

Now, the operation of this image-sensing device having conversion formulae stored in the memory 3 in this way will be described. The level of the electric signal output from one pixel after another of the area sensor 1 is evaluated by the brightness range detector 5. As a result of this evaluation, the maximum and minimum output levels of the electric signal corresponding to one frame output from the area sensor 1 are detected, and these maximum and minimum output levels are fed to the maximum brightness ratio detector 6. Here, the brightness L and the output level X of the electric signal have a relationship as represented by formula (18) below, and thus the maximum and minimum output levels XM and Xm of the electric signal and the maximum and minimum brightness LM and Lm of the subject have a relationship as represented by formula (19) below. Formula (19) can be rearranged as formula (20) below in which the maximum brightness ratio LM/Lm is expressed by using XM−Xm. In formula (18), the symbol A represents a constant.

$$X = A \cdot \ln\frac{L}{Lmin} \tag{18}$$

$$XM - Xm = A\left(\ln\frac{LM}{Lmin} - \ln\frac{LM}{Lmin}\right) \tag{19}$$

$$XM - Xm = A\left(\ln\frac{LM}{Lm}\right) \tag{20}$$

This maximum brightness ratio is fed from the maximum brightness ratio detector 6 to the conversion formula selector 9. The conversion formula selector 9 selects one of the conversion formulae at the addresses a, b, c, d, e, and f in the memory 8 in accordance with whether the maximum brightness ratio LM/Lm output from the maximum brightness ratio detector 6 is below 100, in a range from 100 to 500, in a range from 500 to 1000, in a range from 1000 to 3000, in a range from 3000 to 5000, or greater than 5000, respectively. More specifically, here, the signal output from the maximum brightness ratio detector 6 represents the difference Xd=XM−Xm (i.e. the output level width of the electric signal) between the maximum and minimum output levels XM and Xm of the electric signal. Thus, the conversion formula selector 9 selects one of the conversion formulae at the addresses a, b, c, d, e, and f in the memory 8 in accordance with whether Xd<A·ln 100, A·ln 100≦Xd<A·ln 500, A·ln 500≦Xd<A·ln 1000, A·ln 1000≦Xd<A·ln 3000, A·ln 3000≦Xd<A·ln 5000, or A·ln 5000≦Xd, respectively.

The thus selected conversion formula is fed to the conversion circuit 3, which then, by using the selected conversion formula, converts the electric signal output from the area sensor 1 and feeds the converted electric signal to the processing circuit 4. In this embodiment, the image-sensing device have six types of conversion formulae; however, in practice, it is possible to use any number of conversion formulae.

As described above, according to the present invention, an electric signal so converted as to be logarithmically proportional to the amount of incident light by a photoelectric converter can be converted, though exponential conversion, into an electric signal linearly proportional to the amount of incident light. Thus, it is possible to feed a succeeding processing circuit with a linearly converted electric signal free from flat whiteness or flat blackness. This makes it possible to use, as the succeeding processing circuit, a conventional circuit designed to process a linearly converted electric signal. On the other hand, the photoelectric converter performs logarithmic conversion, which makes acquisition of color information in a high-brightness region possible and thereby offers enhanced color rendering in a high-brightness region.

TABLE 1

| Subject's Maximum Brightness Range | Electric Signal Output Level Width Xd | Address | Conversion Formula |
|---|---|---|---|
| Below 100 | Xd < A · ln 100 | a | $Y = \frac{4095}{100-1}\left(100^{\frac{X-Xm}{4095\times\ln\frac{100}{10000}}} - 1\right)$ |
| From 100 to 500 | A · ln 100 ≦ Xd < A · ln 500 | b | $Y = \frac{4095}{500-1}\left(500^{\frac{X-Xm}{4095\times\ln\frac{500}{10000}}} - 1\right)$ |

TABLE 1-continued

| Subject's Maximum Brightness Range | Electric Signal Output Level Width Xd | Address | Conversion Formula |
|---|---|---|---|
| From 500 to 1000 | $A \cdot \ln 500 \leq Xd < A \cdot \ln 1000$ | c | $Y = \dfrac{4095}{1000 - 1}\left(1000^{\frac{X-Xm}{4095 \times \ln \frac{1000}{10000}}} - 1\right)$ |
| From 1000 to 3000 | $A \cdot \ln 1000 \leq Xd < A \cdot \ln 3000$ | d | $Y = \dfrac{4095}{3000 - 1}\left(3000^{\frac{X-Xm}{4095 \times \ln \frac{3000}{10000}}} - 1\right)$ |
| From 3000 to 5000 | $A \cdot \ln 3000 \leq Xd < A \cdot \ln 5000$ | e | $Y = \dfrac{4095}{5000 - 1}\left(5000^{\frac{X-Xm}{4095 \times \ln \frac{5000}{10000}}} - 1\right)$ |
| Greater than 5000 | $A \cdot \ln 5000 \leq Xd$ | f | $Y = \dfrac{4095}{10000 - 1}\left(10000^{\frac{X-Xm}{4095 \times \ln \frac{10000}{10000}}} - 1\right)$ |

What is claimed is:

1. An image-sensing device comprising:

a photoelectric converter, having a photosensitive device that produces an electric signal in accordance with amount of incident light, for logarithmically converting the electric signal produced by the photosensitive device into an electric output signal;

a signal processing circuit; and an output converter for converting the electric output signal from the photoelectric converter into an electric signal linearly proportional to the amount of incident light and for feeding to the signal processing circuit the thus converted electrical signal which is linearly proportional to the amount of incident light.

2. An image-sensing device as claimed in claim 1, wherein, assuming that the photoelectric converter is capable of shooting a subject having a maximum brightness ratio, which is a ratio of a maximum brightness to a minimum brightness thereof, of up to Lr and that the photoelectric converter has an output level width of Xd, the output converter converts the electric output signal, having an output level of X, from the photoelectric converter into said thus converted electric signal which is linearly proportional to the amount of incident light, with an output level of Y by performing calculation according to a formula;

$$Y = \dfrac{Xd}{Lr - 1}\left(Lr^{\frac{X}{Xd}} - 1\right)(0 \leq X \leq Xd).$$

3. An image-sensing device as claimed in claim 2, further comprising:

a memory for storing the conversion formula.

4. An image-sensing device as claimed in claim 1, further comprising:

a maximum brightness ratio detector for detecting a maximum value and a minimum value of the electric output signal from the photoelectric converter and calculating, from the thus detected maximum and minimum values of the electric output signal, a maximum brightness ratio of a subject; and a conversion formula creator for creating, in accordance with the maximum brightness ratio output from the maximum brightness ratio detector, a conversion formula by use of which the output converter converts the output level of the electric output signal.

5. An image-sensing device as claimed in claim 4, wherein, assuming that the photoelectric converter has an output level width of Xd, that the maximum and minimum values of the electric output signal from the photoelectric converter as detected by the maximum brightness ratio detector are Xmax and Xmin respectively, and that the maximum brightness ratio of the subject as calculated from the thus detected maximum and minimum values Xmax and Xmin of the electric output signal is Ls, the conversion formula creator creates a conversion formula;

$$Y = \dfrac{Xd}{Ls - 1}\left(Ls^{\frac{X - Xmin}{Xmax - Xmin}} - 1\right)(Xmin \leq X \leq Xmax)$$

so that, by use of this conversion formula, the output converter converts the electric output signal, having an output level X, into said thus converted electric signal, which is linearly proportional to the amount of incident light, having an output level Y and feeds the thus converted electric signal, which is linearly proportional to the amount of incident light, to the signal processing circuit.

6. An image-sensing device as claimed in claim 1, further comprising:

a maximum brightness ratio detector for detecting a maximum brightness ratio of a subject to be shot;

a memory for storing a plurality of conversion formulae by use of which the output converter converts the electric output signal; and a conversion formula selector for selecting one of the conversion formulae stored in the memory in accordance with the maximum brightness ratio output from the maximum brightness ratio detector, wherein, using the conversion formula selected by the conversion formula selector, the output converter converts the electric output signal from the photoelectric converter into said electric signal linearly proportional to the amount of incident light and feeds to the signal processing circuit said electric signal which is linearly proportional to the amount of incident light.

7. A method of processing a signal in an image-sensing device including;

a photoelectric converter, having a photosensitive device that produces an electric signal in accordance with amount of incident light, for logarithmically converting the electric signal produced by the photosensitive device into an electrical output signal and, a signal processing circuit, said method comprising:

an exponential conversion step of converting the electric output signal from the photoelectric converter into an electric signal linearly proportional to the amount of incident light; and an output step of feeding to the signal processing circuit the thus converted electric signal which is linearly proportional to the amount of incident light.

8. A method of processing a signal in an image-sensing device as claimed in claim 7, further comprising:

a conversion formula changing step of changing a conversion formula, by which the electric output signal from the photoelectric converter is converted into the electric signal linearly proportional to the amount of incident light, in accordance with a maximum brightness ratio of a subject calculated from a maximum value and a minimum value of the electric output signal from the photoelectric converter.

* * * * *